United States Patent [19]

Rendon

[11] 3,912,809

[45] Oct. 14, 1975

[54] DISINFECTING EMBALMING COMPOSITION

[75] Inventor: Leandro Rendon, Springfield, Ohio

[73] Assignee: The Champion Company, Springfield, Ohio

[22] Filed: June 3, 1974

[21] Appl. No.: 475,650

[52] U.S. Cl. ............ 424/75; 424/333; 27/22; 424/334; 424/148
[51] Int. Cl.² ............................................ A01N 1/00
[58] Field of Search .......................... 424/75, 333

[56] References Cited
UNITED STATES PATENTS

| | | | |
|---|---|---|---|
| 1,870,123 | 8/1932 | Jones | 424/75 |
| 2,318,319 | 5/1943 | McDonald | 424/75 |
| 2,521,108 | 9/1950 | Williams | 424/75 |
| 3,000,782 | 9/1961 | Landau et al. | 424/75 |
| 3,016,328 | 1/1962 | Pepper et al. | 424/333 |
| 3,057,775 | 10/1962 | Rendon | 424/75 |
| 3,282,775 | 11/1966 | Stonehill | 424/333 |
| 3,697,222 | 10/1972 | Sierra | 424/333 |

OTHER PUBLICATIONS

J. Pharm. Sci., Vol. 53, pp. 1273–1275, (1964).

Primary Examiner—Donald B. Moyer
Attorney, Agent, or Firm—Biebel, French & Bugg

[57] ABSTRACT

An improved embalming fluid is disclosed which enables human remains to be preserved in a manner acceptable for funeral viewing purposes, while being disinfected. The disinfected remains prevent the spread of pathogens to handlers of human remains, such as embalmers, medical students, and the like. The improved disinfecting embalming composition generally comprises an embalming fluid containing 2% by weight glutaraldehyde and an alkalinating agent, such as alkali ethylene diamine tetraacetate, and has a pH of 8.0 to 8.5. In its preferred form, the embalming fluid comprises a glutaraldehyde solution and an alkalinating solution which are mixed together to form the embalming fluid.

6 Claims, No Drawings

DISINFECTING EMBALMING COMPOSITION

BACKGROUND OF THE INVENTION

This invention relates to preservatives and more particularly to an improved disinfecting embalming composition.

Recent studies have indicated that humans certified to have died from causes other than infectious diseases can contain pathogens, including bacterial and mycotic. This means that the unembalmed human remains are capable of contributing a multitude of infectious doses of microbial agents to the body handler, the body storage area, or the environment adjacent to the body storage area. It is important, therefore, in handling and disposing of human remains, that some protection be available to the persons handling the remains, such as morticians, doctors, students and the like. Incinerating the remains would be one way of disposing of the remains, and the high temperatures would undoubtedly also dispose of the pathogens. But, not every human remains can or should be disposed in such a manner. Traditionally, and for other reasons, human remains are preserved in some manner, including for future study by medical students as cadavers and for subsequent interment either under ground or in a burial crypt.

Embalming is well-known and traditional means for preserving human remains. The most commonly used compounds for embalming are formaldehyde and glutaraldehyde. For example, U.S. Pat. No. 3,057,775 to Leandro Rendon teaches their use, as well as the advantages of glutaraldehyde embalming compositions over the traditional formaldehyde embalming fluid formulations. But, embalming with the traditional formaldehyde or glutaraldehyde embalming compositions will not necessarily disinfect human remains, even though formaldehyde and glutaraldehyde possess some disinfecting properties. Even where there is disinfection, it is only minimal, and it is apparently not lasting because studies have shown that pathogens exist in embalmed human remains, even where the human remains have been embalmed for extended periods of time.

The use of formaldehyde, as well as the use of glutaraldehyde, as a disinfectant is disclosed in Walker, *Formaldehyde*, American Chemical Society Monograph Series 1964, Third Ed., Reinhold Publ. Corp., New York; Lawrence et al, *Disinfection, Sterilization and Preservation*, 1968, Lea & Febiger, Phila., Pa., Spaulding, "Role of Chemical Disinfection in the Prevention of Nosocomial Infections," *Proceedings of the International Conference on Nosocomial Infections*, Center for Disease Control, August, 1970; and U.S. Pat. No. 3,016,328 to Pepper et al. Spaulding and Pepper further teach the inclusion of an alkalinating agent in the glutaraldehyde solution, with Spaulding also teaching the use of a 2% glutaraldehyde solution.

While the known disinfecting formaldehyde and glutaraldehyde solutions have high level disinfection properties, their only known use has been to disinfect objects, such as hospital walls, floors, instruments, and the like. Usually, they are applied to exterior surfaces or readily accessible locations. They are not useful as embalming compositions, even though both formaldehyde and glutaraldehyde are used in embalming compositions, because they will not condition the body tissue to make it acceptable for funeral viewing purposes. Further, merely combining the disinfecting formaldehyde and/or glutaraldehyde composition with known embalming composition will not necessarily result in a disinfecting embalming composition because, in addition to the unnatural body appearance which can occur, there are problems with getting the disinfectant to readily contact or wet all of the body tissues. If the disinfectant does not reach all of the body tissues, some parts of the body will not be disinfected, and the purpose for including the disinfectant in the embalming composition will be defeated. It is believed that, at best, the mere use of a known disinfectant composition in combination with a known embalming composition will only result in less than a 70% disinfection of human remains. Further, once the solution is made-up, it must be used fairly soon or it loses its effectiveness. For example, buffered aqueous solutions of glutaraldehyde may be employed for only up to three weeks without loss of effectiveness. As a result, either skilled personnel, e.g., chemists, must be employed at the point of use to continually mix new solution or only small amounts of premixed fluid can be purchased at any one time so that the stock will not get too old and spoil.

Thus, a need exists for an improved embalming composition possessing both sporicidal and bactericidal properties.

SUMMARY OF THE INVENTION

Disclosed is a composition useful as an embalming fluid and possessing sporicidal and bactericidal abilities.

Generally, the composition comprises an improved, disinfecting, embalming composition containing approximately 2.0% by weight glutaraldehyde and an alkalinizing agent. The pH of the solution is between 8 and 8.5, and the preferred alkalinizing agent is an alkali ethylene diamine tetra-acetate. In its preferred form, the improved embalming fluid is made from two stable solutions: a glutaraldehyde solution and an alkalinating solution. In this way, the necessary ingredients are combined ahead of time by a skilled person, such as a chemist, then, at the point of use, the solutions can be combined by an unskilled person to form the improved, disinfecting embalming composition. Further, each of the two solutions themselves are stable, and so large inventories can be maintained without fear of spoilage.

The improved embalming fluid of the invention results in a significant reduction in microbial densities, preservation of all body areas, and condition of tissue acceptable for funeral viewing purposes. Further, medical students using a cadaver in their studies will be relatively free from unknowing contact with infectious diseases, since potentially hazardous pathogens which otherwise might have been lurking in untreated and unseen parts of the remains will have been eliminated. In fact, reductions in the bacterial population in dead human remains in excess of 95% can be achieved.

It is therefore an object of this invention to provide an embalming composition which is both sporicidal and bactericidal.

It is a further object of this invention to provide an improved embalming fluid, and method of using it, which will enable human remains to be both disinfected and preserved in a manner acceptable for viewing purposes.

Other objects and advantages of the invention will be apparent from the following description, the accompanying drawings and the appended claims.

DESCRIPTION OF THE PREFERRED EMBODIMENTS

The improved embalming fluid of the invention is broadly speaking an embalming solution containing 2% by weight glutaraldehyde and an alkalinizing agent. Since glutaraldehyde is not stable beyond a few weeks in a alkaline solution, and in high concentrations will polymerize, the embalming fluid was formulated as two solutions: A glutaraldehyde solution and an alkalinating solution. The solutions can then be conveniently mixed to form the embalming fluid, enabling human remains to be both disinfected and preserved in a manner acceptable for funeral viewing purposes.

The glutaraldehyde solution is generally comprised of the following, in parts by weight:

Glutaraldehyde Solution

| | Parts by Weight |
|---|---|
| Glutaraldehyde | 8–12 |
| Formaldehyde | 8–25 |
| Alcohol | 15–26 |
| Water | 27–42 |
| Glycerin | 6–12 |
| Alkyl aryl sodium sulfonate | 0.5–1.0 |
| Tetra hydrofurfuryl alcohol | 0–10 |
| Coloring agents | 0–0.05 |
| Essential Oils (Re-odorants) | 0–1.0 |

Glutaraldehyde, which is used as a 25% water solution, can be used alone or pre-mixed with about 10% to 20% by weight of the alcohol, such as methanol, isopropanol or the like monohydric alcohol, or a higher alcohol such as mannitol and other materials to obtain the particular firming characteristics desired. The formaldehyde can be any commercially available formaldehyde solution, including Formalin (USP) and the like.

Suitable humectants such as glycerin, ethylene glycol, or any of the polyhydric alcohols can also be added as needed to control the moisture content of the embalming material. The alkyl aryl sodium sulfonate is used as an anionic wetting agent, but a non-ionic surface active agent, for example, polyoxyethylene sulfated ether may also be used according to their known abilities. Additionally, coloring agents may be added to the embalming composition to obtain the cosmetic effect desired. In connection with the coloring agents, tetrahydrofurfuryl alcohol has been found to be an excellent solvent and carrier for coloring materials used in embalming to simulate flesh-tones in tissues.

The following examples will serve to illustrate glutaraldehyde solutions according to the invention, in parts by weight.

EXAMPLE I

| | Parts by Weight |
|---|---|
| Glutaraldehyde (25% Solution) | 8–12 |
| Formalin (USP) | 8–25 |
| Water | 27–42 |
| Glycerin | 6–12 |
| Borax | 2–6 |
| Methanol | 15–26 |
| Tetrahydrofurfuryl alcohol | 5–10 |
| Alkyl aryl sodium sulfonate | 0.5–1 |
| Coloring Agents | 0.02–0.05 |

EXAMPLE II

| | |
|---|---|
| Glutaraldehyde (25% Solution) | 52.0 |
| Formalin (USP) | 8.2 |
| Glycerin | 5.0 |
| Isopropanol | 15.0 |
| Alkyl aryl sodium sulfonate | 1.0 |
| Essential Oils (Re-odorants) | 0.3 |
| Coloring, as desired | |
| Water | 18.5 |

The alkalinating solution is comprised of the following, in percent by weight:

Alkalinating Solution

| | Percent by Weight |
|---|---|
| Ethylene Diamine Tetra-acetate Liquid Solution (EDTA) | 25.0 |
| Sodium Citrate as Phosphate | 5.0 |
| Water | 65–70 |
| Other ingredients (coloring, penetrating, re-odorant agents), as desired | |
| Total | 100% |

To make the improved embalming fluid of the invention, the two solutions — glutaraldehyde and alkalinating — are mixed together so that an embalming fluid is formed containing approximately 2.0% by weight of glutaraldehyde and 2.0–3.0% by weight of formaldehyde, and approximately 4 ounces of alkalinating solution per gallon of embalming fluid. The embalming fluid of the invention may be used in a conventional fashion to embalm human remains. The amount of embalming fluid to be used will depend upon the amount of remains to be embalmed and other conventional factors.

The improved embalming fluid of the invention achieves a thorough displacement of blood and body liquids, promotes copious drainage, and creates a firming action which enhances staining characteristics in a preservative. In addition, the preferred embalming fluid of the invention results in a high degree of disinfection, by achieving reductions in bacteria in excess of 95%.

A number of tests were run to determine the effectiveness of the disinfecting embalming fluids in accordance with the teachings of the invention. In order to establish a basis upon which to judge the tests, pre-embalming body fluid and tissue aspirate samples were withdrawn in a conventional manner from test cases (human remains) that had been dead for from six to eleven hours and tested to determine their microbial content. Such a test is described in Rose et al, "The Microbiologic Evaluation and Enumeration of Postmortem Specimens from Human Remains," *Health Laboratory Science*, Vol. 8, April, 1971. The postmortem time intervals were selected as a result of previous temporal indications that the postmortem microbial populations were in a state of exponential growth. Thus, before the tests began, the test remains were evaluated to determine the microbial density therein before embalming.

All samples, i.e., the body fluid and tissue aspirate samples, were initially diluted 1:10 in phosphate buffered saline (PBS) and 0.1 ml of each diluted sample was impinged onto a $0.45\mu$ Millipore (Millipore Corp., Bedford, Mass.) membrane filter (MF), washed once with 10 ml of PBS and then with 10 ml of Dey-Engley universal neutralizing medium (broth) for antimicrobial chemicals. The Dey-Engley antimicrobial neutralizer contains chemicals selective for the neutralization of formaldehyde and glutaraldehyde. A six-place manifold with sterile funnels and accessory items (Millipore) was utilized throughout the study to standardize sample handling and microbial quantitation. The MF's, with impinged, washed, and neutralized samples, were rolled onto primary isolation media (MacConkey and Blood Agar plates) and incubated at 35°–37°C for 24 to 48 hours. Colonial isolates were subcultured and characterized by pertinent methods.

Once the microbial density basis was established, the test cases were professionally embalmed, using embalming fluids formulated in accordance with the teachings of the invention, at the Wayne State University Department of Mortuary Science by a licensed member of the embalming teaching staff. In every case, medical certifications indicated the primary cause of death to be other than an infectious disease. All cases were evaluated and deemed completely suitable for normal funeral service viewing purposes. Injections and drainage procedures always involved multi-point selections, such as the carotid artery/juglar vein and the femoral artery/femoral vein sites. The arterial "test" injection solution was administered using a moderate rate of flow (10–12 minutes to inject each gallon) and a sufficient pressure (2–10 pounds) to maintain that rate of injection. After visible discolorations were removed, the intermittent and/or restricted type of drainage was used for the remainder of the operation.

Following arterial injection, the contents of the abdominal and thoracic cavities were chemically treated with 32 ounces of concentrated, commercially-available biologic preservative-disinfectant containing 10 percent formaldehyde, 2.0 percent glutaraldehyde, and 8.5 percent phenol in an alcohol base, per cavity. The commercially available disinfectant can be used at this point, because the abdominal and thoracic cavities are readily accessible. Further the preserving characteristics of the embalming fluid are unnecessary.

Within 20–24 hours after embalming, samples were again taken from the test cases and evaluated to determine their microbial content. The following table I is a summary of the tests and results. The three solutions A, B, and C were all prepared in accordance with the teachings of the invention, with the only variances being that solution A contained 2.0 percent formaldehyde and 2.0 percent glutaraldehyde, solution B contained 3.3 percent formaldehyde and 2.0 percent glutaraldehyde, and solution C contained 2.8 percent formaldehyde and 2.37 percent glutaraldehyde.

As seen from table I, in test Cases II, IV, and V, the quantitative post-embalming reduction of microbial densities exceeded 95 percent within 20 to 24 hours. The total volume of arterial injection solution used in these three test cases was 3.5 to 4.0 gallons. In test Case No. 1, only 2 gallons of arterial injection solution were used and the microbial populations increased progressively throughout the post-embalming sampling period of 22 hours. This indicated that the volume of solution and/or the concentration of active ingredients employed were insufficient. While tissue fixation in terms of normal in-state preparation and appearance was adequate, the microbial effects were unsatisfactory. In Case III, there were apparently no microbial agents present since none were recovered from the unembalmed body. It was believed that the extensive atemortem administration of therapeutic antimicrobial agents was responsible for the negative baseline or control densities. It should be noted, however, that throughout the post-embalming period of 25 hours there was no evidence of microbial colonization or recolonization from exogenous or other sources. The embalming chemicals, thus, effectively prevented the possible resumption of microbial growth and proliferation.

While the method and composition of matter herein described constitute preferred embodiments of the invention, it is to be understood that the invention is not limited to this precise method and composition of matter, and that changes may be made therein without departing from the scope of the invention.

What is claimed is:

1. A disinfecting embalming composition comprising a mixture of glutaraldehyde solution and an alkalinating solution wherein the mixture contains approximately 2% by weight glutaraldehyde, approximately 2.0 to 3.0% by weight formaldehyde and approximately 4 ounces of alkalinating solution, and wherein said glutaraldehyde and said alkalinating solutions are comprised of the following:

Glutaraldehyde Solution

|  | Parts by Weight |
|---|---|
| Glutaraldehyde | 8–12 |
| Formaldehyde | 8–25 |
| Alcohol | 15–26 |
| Water | 27–42 |
| Glycerin | 6–12 |
| Alkyl aryl sodium sulfonate | 0.5–1.0 |
| Tetra hydrofurfuryl alcohol | 0–10 |
| Coloring agents | 0–0.05 |
| Essential Oils (Re-odorants) | 0–1.0 |

Alkalinating Solution
Percent by Weight

Table I

MICROBICIDAL EFFECTS OF EMBALMING SOLUTIONS

| Case NO. | BODY WEIGHT (LBS.) | INTERVAL BETWEEN DEATH & EMBALMING (Hours) | INJECTION SOLUTION Type | INJECTION SOLUTION Vol/Gal. | MICROBIAL DENSITIES (Average, all sampling sites) Pre-Embalming | MICROBIAL DENSITIES (Average, all sampling sites) Post-Embalming | PERCENT REDUCTION |
|---|---|---|---|---|---|---|---|
| I | 180 | 8 | A | 2.0 | 1,000 | 10,000–100,000 | Densities Increased |
| II | 90 | 11 | B | 4.0 | 100,000–1,000,000 | 0–100 | >95 |
| III | 105 | 8 | C | 4.0 | 0 | 0 | No Change |
| IV | 160 | 6 | C | 4.0 | 1,000–10,000 | 0–400 | >95 |
| V | 150 | 10 | C | 3.5 | 100,000–1,000,000 | 0–50 | >95 |

-continued

Glutaraldehyde Solution

| | Parts by Weight |
|---|---|
| Ethylene diamine tetraacetate [tetraacentate] | 25.0 |
| Sodium Citrate or Phosphate | 5.0 |
| Water | 65.0–70.0 |
| Total | 100% | said alcohol being selected from the group consisting of methanol, isopropanol and mannitol.

2. The composition of claim 1 wherein the glutaraldehyde solution comprises the following:

| | Parts by Weight |
|---|---|
| Glutaraldehyde (25% Solution) | 52.0 |
| Formalin (USP) | 8.2 |
| Glycerin | 5.0 |
| Isopropanol | 15.0 |
| Alkyl aryl sodium sulfonate | 1.0 |
| Essential oils (Re-odorants) | 0.3 |
| Water | 18.5 |

3. A disinfecting embalming composition comprising a mixture of glutaraldehyde solution and an alkalinating solution wherein the mixture contains approximately 2% by weight glutaraldehyde, approximately 2.0 to 3.0% by weight formaldehyde and approximately 4 ounces of alkalinating solution, and wherein said glutaraldehyde and said alkalinating solutions are comprised of the following:

Glutaraldehyde Solution

| | Parts by Weight |
|---|---|
| Glutaraldehyde (25% Solution) | 8–12 |
| Formalin (USP) | 8–25 |
| Water | 27–42 |
| Glycerin | 6–12 |
| Borax | 2–6 |
| Methanol | 15–26 |
| Tetrahydrofurfuryl alcohol | 5–10 |
| Alkyl aryl sodium sulfonate | 0.5–1 |
| Coloring Agents | 0.02–0.05 |

Alkalinating Solution

| | Percent by Weight |
|---|---|
| Ethylene diamine tetraacetate | 25.0 |
| Sodium Citrate or Phosphate | 5.0 |
| Water | 65.0–70.0 |
| Total | 100%. |

4. A method of disinfecting and preserving body tissues of a corpse comprising the step of injecting into the arterial system of said corpse an effective amount of a composition comprising a mixture of a glutaraldehyde solution and an alkalinating solution wherein the mixture contains approximately 2% by weight glutaraldehyde, approximately 2.0 to 3.0% by weight formaldehyde and approximately 4 ounces of alkalinating solution, and wherein said glutaraldehyde and said alkalinating solutions are comprised of the following:

Glutaraldehyde Solution

| | Parts by Weight |
|---|---|
| Glutaraldehyde | 8–12 |
| Formaldehyde | 8–25 |
| Alcohol | 15–26 |
| Water | 27–42 |
| Glycerin | 6–12 |
| Alkyl aryl sodium sulfonate | 0.5–1.0 |
| Tetra hydrofurfuryl alcohol | 0–10 |
| Coloring agents | 0–0.05 |
| Essential Oils (Re-odorants) | 0–1.0 |

Alkalinating Solution

| | Percent by Weight |
|---|---|
| Ethylene diamine tetraacetate | 25.0 |
| Sodium Citrate or Phosphate | 5.0 |
| Water | 65.0–70.0 |
| Total | 100% | said alcohol being selected from the group consisting of methanol, isopropanol and mannitol.

5. The method of claim 4 wherein the glutaraldehyde solution comprises the following:

| | Parts by Weight |
|---|---|
| Glutaraldehyde (25% Solution) | 52.0 |
| Formalin (USP) | 8.2 |
| Glycerin | 5.0 |
| Isopropanol | 15.0 |
| Alkyl aryl sodium sulfonate | 1.0 |
| Essential Oils (Re-odorants) | 0.3 |
| Water | 18.5 |

6. A method of disinfecting and preserving body tissues of a corpse comprising the step of injecting into the arterial system of said corpse an effective amount of a composition comprising a mixture of a glutaraldehyde solution and an alkalinating solution wherein the mixture contains approximately 2% by weight glutaraldehyde, approximately 2.0 to 3.0% by weight formaldehyde and approximately 4 ounces of alkalinating solution, and wherein said glutaraldehyde and said alkalinating solutions are comprised of the following:

glutaraldehyde Solution

| | Parts by Weight |
|---|---|
| Glutaraldehyde (25% Solution) | 8–12 |
| Formalin (USP) | 8–25 |
| Water | 27–42 |
| Glycerin | 6–12 |
| Borax | 2–6 |
| Methanol | 15–26 |
| Tetrahydrofurfuryl alcohol | 5–10 |
| Alkyl aryl sodium sulfonate | 0.5–1 |
| Coloring Agents | 0.02–0.05 |

Alkalinating Solution

| | Percent by Weight |
|---|---|
| Ethylene diamine tetraacetate | 25.0 |
| Sodium Citrate or Phosphate | 5.0 |
| Water | 65.0–70.0 |
| Total | 100%. |

\* \* \* \* \*